(12) United States Patent
Kurashina

(10) Patent No.: US 11,491,821 B2
(45) Date of Patent: Nov. 8, 2022

(54) TIRE

(71) Applicant: BRIDGESTONE CORPORATION, Tokyo (JP)

(72) Inventor: Daisuke Kurashina, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 305 days.

(21) Appl. No.: 16/770,619

(22) PCT Filed: Dec. 12, 2018

(86) PCT No.: PCT/JP2018/045762
§ 371 (c)(1),
(2) Date: Jun. 8, 2020

(87) PCT Pub. No.: WO2019/117215
PCT Pub. Date: Jun. 20, 2019

(65) Prior Publication Data
US 2020/0307318 A1    Oct. 1, 2020

(30) Foreign Application Priority Data

Dec. 13, 2017    (JP) .............................. JP2017-239042

(51) Int. Cl.
*B60C 11/00* (2006.01)
(52) U.S. Cl.
CPC ...... *B60C 11/0041* (2013.01); *B60C 11/0058* (2013.01); *B60C 2011/0025* (2013.01)

(58) Field of Classification Search
CPC ............. B60C 11/0041; B60C 11/0058; B60C 2011/0025
See application file for complete search history.

(56) References Cited

U.S. PATENT DOCUMENTS

| | | | |
|---|---|---|---|
| 4,319,620 A | 3/1982 | Knill | |
| 4,385,653 A | 5/1983 | Okazaki et al. | |
| 8,127,813 B2 | 3/2012 | Katayama et al. | |
| 8,480,829 B2 * | 7/2013 | Houjou | B60C 11/0306 156/130.5 |
| 8,925,599 B2 | 1/2015 | Okabe | |
| 10,457,101 B2 | 10/2019 | Volk et al. | |
| 2012/0298271 A1 | 11/2012 | Bijaoui | |
| 2015/0083293 A1 * | 3/2015 | Zhao | B60C 1/0016 152/209.5 |

(Continued)

FOREIGN PATENT DOCUMENTS

| | | |
|---|---|---|
| CN | 101304891 A | 11/2008 |
| CN | 103042885 A | 4/2013 |

(Continued)

OTHER PUBLICATIONS

Machine translation for Japan 2004-345432 (Year: 2022).*

(Continued)

*Primary Examiner* — Steven D Maki
(74) *Attorney, Agent, or Firm* — Kenja IP Law PC

(57) ABSTRACT

In the tread of the tire, the average modulus value in a center region including the equatorial plane of the tire is higher than the average modulus value in shoulder regions adjacent to edges of the tread, and in the shoulder regions, the modulus value is higher in a surface layer of the tread than in a portion other than the surface layer.

15 Claims, 3 Drawing Sheets

(56) References Cited

U.S. PATENT DOCUMENTS

| | | |
|---|---|---|
| 2018/0272800 A1 | 9/2018 | Kuwayama et al. |
| 2018/0272806 A1 | 9/2018 | Hamanaka |

FOREIGN PATENT DOCUMENTS

| | | | |
|---|---|---|---|
| DE | 102008018345 A1 | | 10/2009 |
| DE | 102013103367 A1 | | 10/2014 |
| EP | 2067637 A1 | | 6/2009 |
| FR | 2952855 A1 | | 5/2011 |
| JP | S5699805 A | | 8/1981 |
| JP | 02-249707 A | * | 10/1990 |
| JP | H0648115 A | | 2/1994 |
| JP | H06297911 A | | 10/1994 |
| JP | 07-117411 A | * | 5/1995 |
| JP | H07117411 A | | 5/1995 |
| JP | 2004-345432 A | * | 12/2004 |
| JP | 2008024045 A | | 2/2008 |
| JP | 2008189042 A | | 8/2008 |
| JP | 2009173048 A | | 8/2009 |
| JP | 2010234897 A | | 10/2010 |
| JP | 2013512142 A | | 4/2013 |
| JP | 2014121949 A | | 7/2014 |
| JP | 2014136562 A | | 7/2014 |
| JP | 2017052330 A | | 3/2017 |
| WO | 2017061491 A1 | | 4/2017 |

OTHER PUBLICATIONS

Machine translation for Japan 07-117411 (Year: 2022).*
Translation for Japan 02-249707 (Year: 2022).*
Oct. 13, 2021, search result of Office Action issued by the China National Intellectual Property Administration in the corresponding Chinese Patent Application No. 201880077811.8.
Jun. 7, 2021, search result of the Extended European Search Report issued by the European Patent Office in the corresponding European Patent Application No. 18887614.8.
Mar. 19, 2019, International Search Report issued in the International Patent Application No. PCT/JP2018/045762.
Jun. 16, 2020, International Preliminary Report on Patentability issued in the International Patent Application No. PCT/JP2018/045762.

* cited by examiner

TIRE

TECHNICAL FIELD

The present disclosure relates to a tire, particularly to a tire that achieves both suppression of rolling resistance and an improvement in cornering power.

BACKGROUND

To suppress the rolling resistance of a tire, a method for dividing the rubber forming the tread of the tire into a plurality of regions in the tire width direction and varying the physical properties of the rubber between regions is known.

For example, patent literature (PTL) 1 discloses dividing the tread of the tire into three regions: a center region in the widthwise central portion, and shoulder regions on the widthwise sides of the center region. Furthermore, the value of the loss tangent tan δ of the rubber in the center region is made larger than in the shoulder regions of the tire, and the value of the elastic modulus of the rubber forming each region is also made larger in the center region than in the shoulder regions, thereby simultaneously achieving rolling resistance, braking performance on wet road surfaces, and the like.

CITATION LIST

Patent Literature

PTL 1: JP2008-24045A

SUMMARY

Technical Problem

In PTL 1, the elastic modulus of the tread is varied between the center region and the shoulder regions, allowing a reduction in the rolling resistance. On the other hand, using rubber with a lower elastic modulus than in the center region to form the shoulder regions leads to a lack of rigidity in the shoulder regions that are on the outside of the vehicle, particularly during cornering. As a result, the cornering power of the tire is reduced. Furthermore, a reduction in cornering power adversely affects the wear resistance performance.

Therefore, it is an object of the present disclosure to suppress a reduction in cornering power while maintaining the effect of suppressing rolling resistance.

Solution to Problem

Upon diligently studying how to solve the aforementioned problem, I discovered that by dividing the tread of the tire into a plurality of regions in the tire width direction, prescribing the physical properties of the rubber forming each region, and varying the physical properties of the rubber on the tread surface side and the tire radial direction inside of the tire for the rubber forming the shoulder regions, the cornering power can be improved without impairing the effect of suppressing the rolling resistance, thereby completing the present disclosure.

The main features of the present disclosure are as follows.

A tire of the present disclosure comprises a tread; wherein in the tread, an average modulus value in a center region including an equatorial plane of the tire is higher than an average modulus value in shoulder regions adjacent to edges of the tread; and wherein in the shoulder regions, a modulus value is higher in a surface layer of the tread than in a portion other than the surface layer.

In the present disclosure, the "center region" refers to a region centered on the tire equatorial plane CL and extending from the tire equatorial plane CL on either side to points 25% of the tire tread width away. The "shoulder regions" refer to the regions from the tire widthwise edges of the center region of the tread to the tread edges.

The "tread edges" refer to the outermost ground contact portions in the tire width direction when the tire is mounted on an applicable rim, is filled to a prescribed internal pressure, and has a prescribed load applied. The "applicable rim" refers to a rim prescribed by industrial standards effective in a region where the tire is manufactured and used, such as the Japan Automobile Tyre Manufacturers Association (JATMA) YEAR BOOK in Japan, the European Tyre and Rim Technical Organisation (ETRTO) STANDARD MANUAL in Europe, and the TIRE AND RIM ASSOCIATION INC. (TRA) YEAR BOOK in the USA. The "prescribed internal pressure" refers to the air pressure corresponding to the maximum load (maximum load capability) of a single wheel at an applicable size described in the aforementioned industrial standards. The "prescribed load" refers to the maximum load (maximum load capability) of a single wheel at an applicable size prescribed in the aforementioned industrial standards. Furthermore, the "tread width of the tire" refers to the tire widthwise distance between the tread edges of the tire.

The "modulus" is the tensile stress at 100% elongation measured by preparing a JIS dumbbell-shaped #3 sample and performing a tensile test in accordance with JIS K6251 under the conditions of a temperature of 30° C. and a speed of 500±25 mm/min.

Furthermore, the "surface layer of the tread" in the present disclosure refers to a 2 mm thick layer from the tread surface inward in the tire radial direction.

Advantageous Effect

The present disclosure can provide a tire capable of suppressing a reduction in cornering power while maintaining the effect of suppressing rolling resistance.

DETAILED DESCRIPTION

First Embodiment

A tire according to the present disclosure is described below in detail with reference to the drawings.

Figure 1:
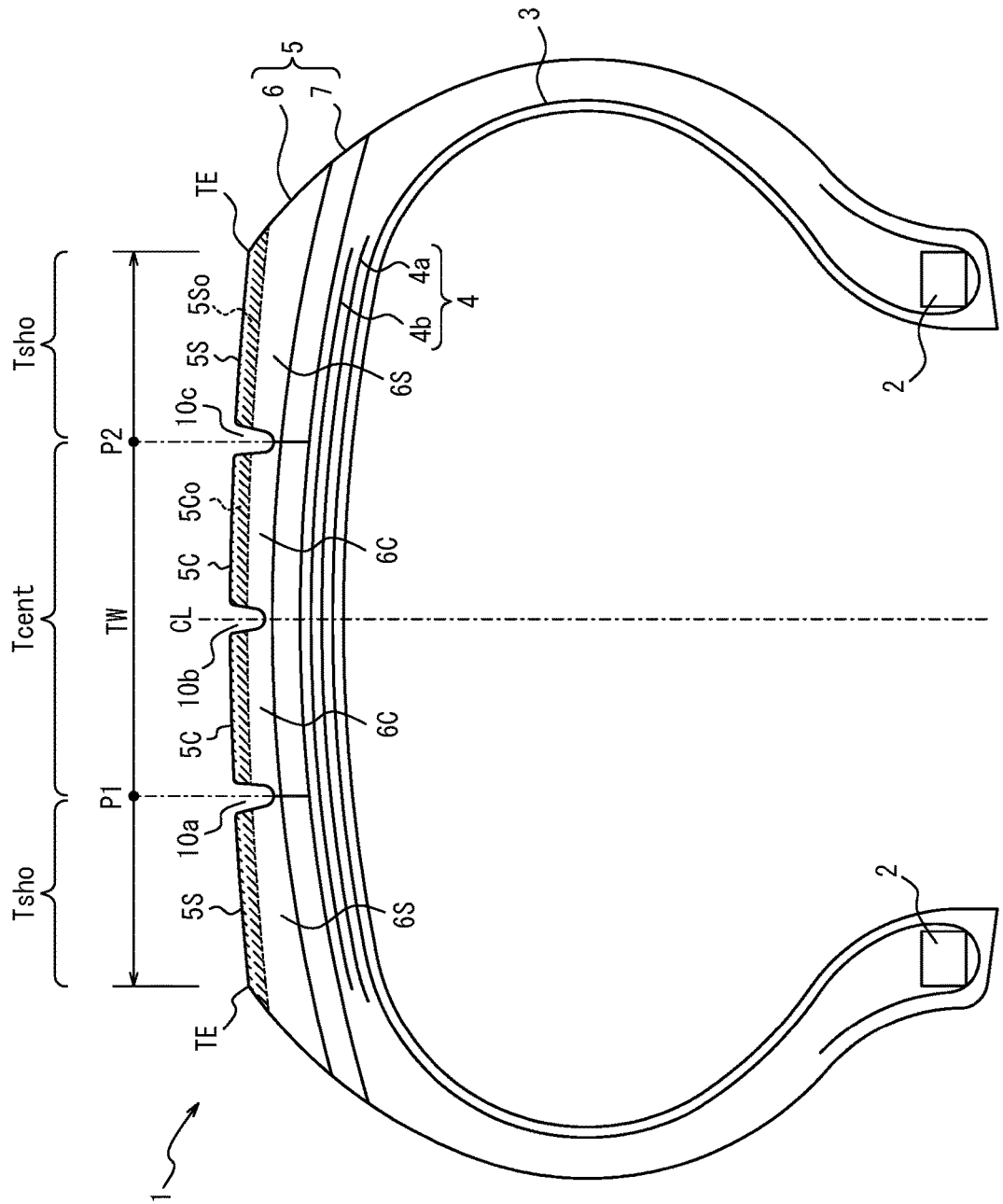
FIG. 1 is a cross-sectional view of a tire according to an embodiment of the present disclosure.

FIG. 1 is a widthwise cross-sectional view of a tire according to the present disclosure. The tire 1 of the present disclosure includes a carcass 3, as a frame, extending toroidally between a pair of bead cores 2; a belt 4 formed by two inclined belt layers 4a, 4b on the outside of the carcass 3 in the tire radial direction; and tread rubber 5. The inclined belt layers 4a, 4b are inclined relative to the tire equatorial plane CL and are formed by a plurality of cords that extend to intersect with each other between layers and are covered with rubber. The bead cores 2, carcass 3, and belt 4 are not limited to the illustrated examples. For example, the carcass 3 can also be constituted by two carcass plies, and the belt 4 can be provided with a circumferential belt layer. The tread surface may have any tread pattern. In FIG. 1, four land portions are defined by circumferential grooves 10a, 10b, 10c.

The tread rubber 5 is presented as having a double layer structure in the tire radial direction, formed by a cap rubber layer 6 on the tread surface side and a base rubber layer 7 provided on the tire radial direction inside of the cap rubber layer 6, but the tread rubber 5 need not have two layers.

In the illustrated example, the thickness of the cap rubber layer 6 is greater than the thickness of the base rubber layer 7. The thickness of the cap rubber layer 6 and the base rubber layer 7 refers to the average thickness in the tire radial direction. These thicknesses are not limited to the illustrated examples and may be set appropriately to obtain the basic performance of the tire.

The tread is divided into a center region Tcent and shoulder regions Tsho. Specifically, the region centered on the tire equatorial plane CL and extending from the tire equatorial plane CL on either side to points P1 and P2 that are 25% of the tire tread width TW away is the center region Tcent. The regions from the points P1 and P2, which are the tire widthwise edges of the center region Tcent, to the tread edges TE are the shoulder regions Tsho. At this time, it is essential that an average modulus value M1 of center rubber 5C forming the center region Tcent is greater than an average modulus value M2 of shoulder rubber 5S forming the shoulder regions Tsho. Here, the average modulus value refers to the average of the modulus value in the tire radial direction.

The aforementioned configuration whereby the average modulus values of the center rubber 5C and the shoulder rubber 5S satisfy the relationship M1>M2 allows suppression of the rolling resistance of the tire. In other words, the rolling resistance of the tire can be reduced by reducing the energy consumed by repeated deformation accompanying rolling of the tire. That is, the center rubber 5C functions as a core supporting the load of the tire in the center region Tcent of the tire. Setting the average modulus value M1 to be relatively higher can therefore decrease distortion relative to the load. On the other hand, the tread tends to be deformed in the shoulder regions Tsho of the tire when contacting the road surface. Setting the average modulus value M2 of the shoulder rubber 5C to be relatively lower can therefore reduce stress on the rubber and keep energy consumption down.

The ratio M2/M1 of the average modulus value M2 of the shoulder rubber 5S to the average modulus value M1 of the center rubber 5C is preferably 80% or more and less than 100%. Setting the ratio to 80% or more can prevent the difference in physical properties between the center rubber 5C and the shoulder rubber 5S from becoming excessive, and setting the ratio to less than 100% can maintain the function of the center region Tcent as the load supporting core.

Furthermore, it is essential that in the shoulder rubber 5S, the modulus value be higher in the surface layer 5So of the tread than in portions other than the surface layer 5So. In other words, in addition to the average modulus value M1 of the center rubber 5C being greater than the average modulus value M2 of the shoulder rubber 5S, the surface layer 5So of the tread in the shoulder rubber 5S is provided with a rubber property having a higher modulus value M3 than in portions other than the surface layer 5So, thereby reducing the modulus value difference between the tread surface in the center region Tcent and the tread surface in the shoulder regions Tsho and suppressing a difference in rigidity between the center region Tcent and shoulder regions Tsho in the ground contact region when the tire rolls with a load. This is effective for maintaining high cornering power. Furthermore, wear resistance performance is also obtained by maintaining the cornering power.

Assuming that the ratio M2/M1 is 80% or more and less than 100% as described above, the average modulus value M1 of the center rubber 5C can be set to 2 MPa or more and 4 MPa or less and the average modulus value M2 of the shoulder rubber 5S can be set to 1.6 MPa or more and 4 MPa or less, for example. Furthermore, the modulus value M3 in the surface layer 5So of the shoulder rubber 5S can be set to 1.9 MPa or more and 4 MPa or less. In other words, distortion can be decreased relative to the load by setting the average modulus value M1 to 2 MPa or more, and wear resistance can also be obtained by setting the average modulus value M1 to 4 MPa or less. The difference from the average modulus value M1 can be prevented from becoming excessively large by setting the average modulus value M2 to 1.6 MPa or more, and the effect of reducing stress of the rubber can be sufficiently obtained and the rolling resistance can be suppressed by setting the average modulus value M2 to 4 MPa or less. Furthermore, the difference in rigidity between the center region Tcent and the shoulder regions Tsho can be suppressed and cornering power can be sufficiently maintained by setting the modulus value M3 in the surface layer 5So of the shoulder rubber 5S to 1.9 MPa or more and 4 MPa or less.

Here, the modulus value M3 of the surface layer 5So of the shoulder rubber 5S is preferably identical to the modulus value M4 of the surface layer 5Co of the center rubber 5C.

Here, "identical" is not limited to the modulus values being the same value but also includes the case of the difference between the modulus value M3 of the surface layer of the shoulder rubber 5S and the modulus value M4 of the surface layer of the center rubber 5C (modulus value M3−modulus value M4) being −5% or more and 0% or less of the modulus value M4 of the surface layer of the center rubber 5C. In other words, the above structure can suppress the difference in rigidity between the center region Tcent and the shoulder regions Tso of the tread surface and is effective for maintaining high cornering power. Furthermore, wear resistance performance is also obtained by maintaining the cornering power. In addition, uneven wear due to a difference in the level of rigidity can also be prevented.

Assuming that the aforementioned ratio is −5% or more and 0% or less, the modulus value M4 in the surface layer 5Co of the center rubber 5C can be set to 2 MPa or more and 4 or less, and the modulus value M3 in the surface layer 5So of the shoulder rubber 5S can be set to 1.9 MPa or more and 4 or less.

In the illustrated example tire, i.e. a tire with a cap-base structure, mainly changing the rubber properties of the cap rubber layer 6 in the center region Tcent and the shoulder regions Tsho fits in well with achievement of the structure described thus far.

In other words, the cap rubber layer 6 in the illustrated example is formed by a center cap rubber layer 6C constituting the center region Tcent of the tread and shoulder cap rubber layers 6S constituting the shoulder regions Tsho of the tread. In the illustrated example, the circumferential grooves 10a and 10c are positioned at the boundary between the center region Tcent and the shoulder regions Tsho, but the grooves may be at any position or may be omitted. Also, the base rubber layer 7 is formed uniformly in the tire width direction in the illustrated example but may be divided in the tire width direction.

Figure 2:
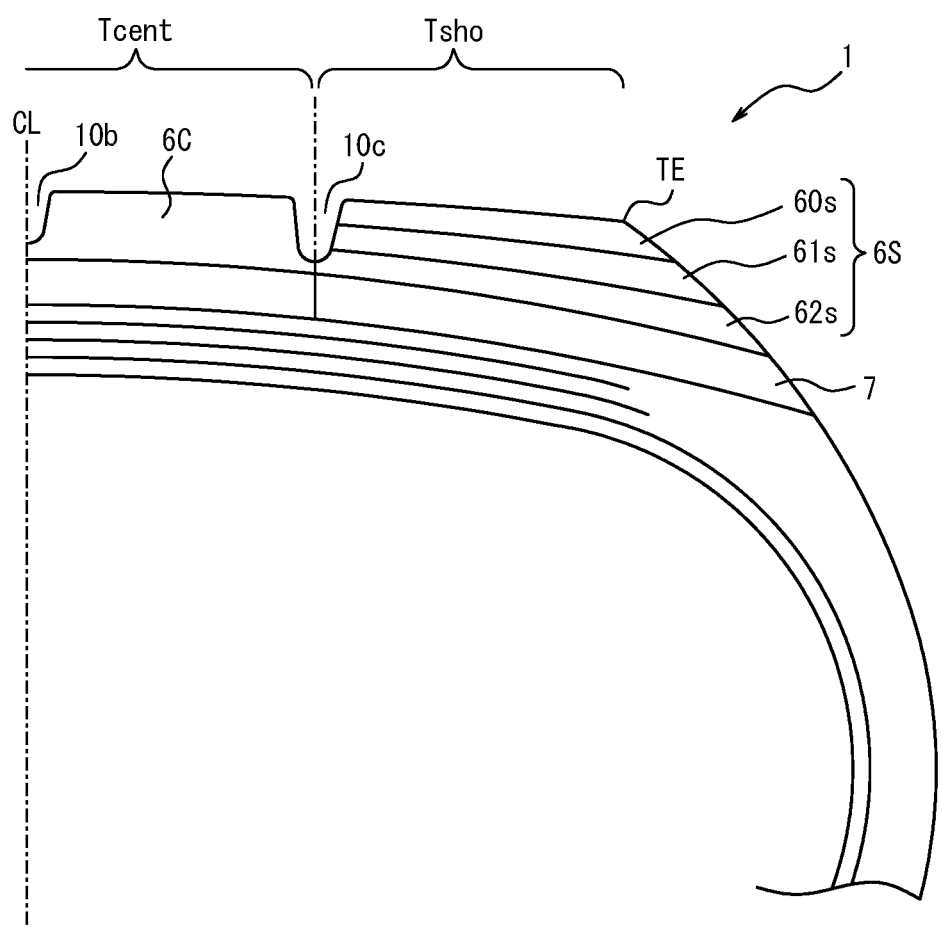
FIG. 2 is an enlarged cross-sectional view of a portion of the tire in FIG. 1.

With reference to FIG. 2, the structure of the tire according to the present disclosure is described in more detail. FIG. 2 is an enlarged cross-sectional view of a portion of the tire 1 in FIG. 1.

The shoulder cap rubber layer 6S preferably includes a plurality of layers stacked in the tire radial direction and includes three layers 60s, 61s, and 62s in the example in FIG. 2. Such a structure with a plurality of layers allows easy formation of rubber having a plurality of different physical properties in the cap rubber layer. Although three layers are included in the illustrated example, the number of layers may be two or may be four or more.

The three layers 60s, 61s, and 62s can each be formed from rubber with different physical properties. For example, the modulus values of the layers preferably satisfy the relationship of layer 60s>layer 61s>layer 62s. This structure can improve cornering power and reduce uneven wear while enjoying the effect of rolling resistance suppression. Furthermore, since the modulus value changes stepwise, rubber separation or the like due to a change in physical properties in the tire radial direction can be suppressed.

For example, the modulus value of the layer 60s may be set to 3.3 MPa or more and 3.5 MPa or less, the modulus value of the layer 61s may be set to 2.8 MPa or more and 3 MPa or less, and the modulus value of the layer 62s may be set to 2.6 MPa or more and 3 MPa or less.

The three layers 60s, 61s, and 62s may have any thickness. In the illustrated example, the thickness of the three layers 60s, 61s, and 62s is substantially uniform. The thickness of the three layers 60s, 61s, and 62s refers to the average thickness in the tire radial direction.

Furthermore, the shoulder cap rubber layer 6S may be structured so that the modulus value decreases from the tread surface inward in the tire radial direction. At this time, a plurality of layers may be provided in the tire radial direction, or the physical properties alone may change within one layer. The change in physical properties is smooth in the tire radial direction with this structure, thereby allowing prevention of rubber separation or the like.

Second Embodiment

Figure 3:
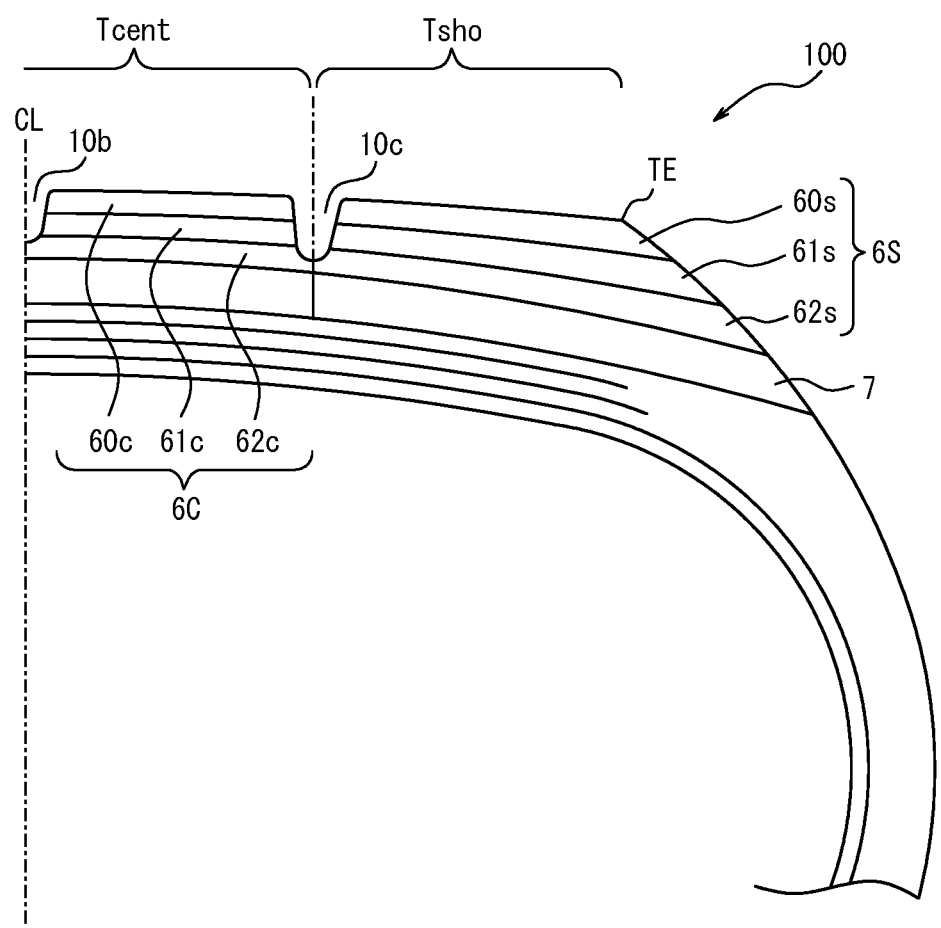
FIG. 3 is an enlarged cross-sectional view of a portion of a tire according to another embodiment of the present disclosure.

With reference to FIG. 1 and FIG. 3, the second embodiment of a tire according to the present disclosure is described below. FIG. 3 is an enlarged cross-sectional view of a portion of a tire according to another embodiment of the present disclosure. This tire 1 has the same internal reinforced structure as the tire 1 in FIG. 1 and FIG. 2. The tire in the second embodiment has the same structure as the tire according to the first embodiment, except that the form of the center rubber 5C differs.

In the tire according to the present embodiment, the center rubber 5C preferably has a modulus value M4 that is lower in the surface layer 5Co of the tread than in portions other than the surface layer 5Co. In other words, the center rubber 5C may be structured so that the modulus value is uniform from the tread surface inward in the tread radial direction or is larger on the inside, thereby achieving the function of a core that supports the load when the tire is rolling. To guarantee safety as a load support core, however, the modulus value inward in the tread radial direction is more preferably increased. Furthermore, reducing the modulus value near the tread surface of the center region Tcent makes it easier for the difference in rigidity from the surface layer 5So of the tread in the shoulder rubber 5S to shrink, further facilitating prevention of a reduction in cornering power. The occurrence of uneven wear due to a difference in the level of rigidity can also be reduced.

In greater detail, the modulus value of the surface layer 5Co of the center rubber 5C can, for example, be set to 3.3 MPa or more and 3.5 MPa or less. Setting the modulus value to 3.3 MPa or more allows reduction of distortion relative to the load, and setting the modulus value to 3.5 MPa or less facilitates shrinking the difference in rigidity from the shoulder cap rubber layer 6S and facilitates prevention of a reduction in cornering power. The occurrence of uneven wear due to a difference in the level of rigidity can also be reduced.

In FIG. 3, the center cap rubber layer 6C includes a plurality of layers 60c, 61c, and 62c stacked in the tire radial direction. While three layers are included in the illustrated example, one, two, or four or more layers may be included. The plurality of layers can be formed from rubber with different physical properties.

Here, the modulus values of the layers preferably satisfy the relationship of layer 60c layer 61c layer 62c. This structure can improve cornering power and reduce uneven wear while enjoying the effect of rolling resistance suppression. Furthermore, since the modulus value changes stepwise, rubber separation or the like due to a change in physical properties in the tire radial direction can be suppressed when the modulus value differs between layers.

The three layers 60c, 61c, and 62c may have any thickness. In the illustrated example, the thickness of the three layers 60c, 61c, and 62c is substantially uniform. The thickness of the three layers 60c, 61c, and 62c refers to the average thickness in the tire radial direction.

Furthermore, the center cap rubber layer 6C may be structured so that the modulus value increases from the tread surface inward in the tire radial direction. At this time, a plurality of layers may be provided in the tire radial direction, or the physical properties alone may change within one layer. The change in physical properties is smooth in the tire radial direction with this structure, thereby allowing prevention of rubber separation or the like.

REFERENCE SIGNS LIST

1 Tire
2 Bead core
3 Carcass
4a, 4b Inclined belt layer
4 Belt
5 Tread rubber
5C Center rubber
5S Shoulder rubber
5Co Surface layer of tread in center rubber
5So Surface layer of tread in shoulder rubber
6 Cap rubber layer
6C Center cap rubber layer
6S Shoulder cap rubber layer
60s, 61s, 62s, 60c, 61c, 62c Layer
7 Base rubber layer
10a, 10b, 10c Circumferential groove

The invention claimed is:
1. A tire comprising:
a tread;

wherein in the tread, an average modulus value in a center region including an equatorial plane of the tire is higher than an average modulus value in shoulder regions adjacent to edges of the tread; and wherein in the shoulder regions, a modulus value is higher in a surface layer of the tread than in a portion of the shoulder regions other than the surface layer, and wherein in the center region, the modulus value is lower in the surface layer of the tread than in a portion of the center region other than the surface layer.

2. The tire of claim 1, wherein the modulus value of the surface layer of the tread in the shoulder regions is identical to the modulus value of the surface layer of the tread in the center region.

3. The tire of claim 2, wherein a ratio of the average modulus value in the shoulder regions to the average modulus value in the center region is 80% or more and less than 100%.

4. The tire of claim 2, wherein the modulus value of the surface layer of the tread in the center region is 2 MPa or more and 4 MPa or less.

5. The tire of claim 2, wherein the tread is formed by a cap rubber layer on a surface side of the tread and a base rubber layer on a tire radial direction inside of the cap rubber layer.

6. The tire of claim 1, wherein a ratio of the average modulus value in the shoulder regions to the average modulus value in the center region is 80% or more and less than 100%.

7. The tire of claim 6, wherein the modulus value of the surface layer of the tread in the center region is 2 MPa or more and 4 MPa or less.

8. The tire of claim 6, wherein the tread is formed by a cap rubber layer on a surface side of the tread and a base rubber layer on a tire radial direction inside of the cap rubber layer.

9. The tire of claim 1, wherein the modulus value of the surface layer of the tread in the center region is 2 MPa or more and 4 MPa or less.

10. The tire of claim 9, wherein the tread is formed by a cap rubber layer on a surface side of the tread and a base rubber layer on a tire radial direction inside of the cap rubber layer.

11. The tire of claim 1, wherein the tread is formed by a cap rubber layer on a surface side of the tread and a base rubber layer on a tire radial direction inside of the cap rubber layer.

12. The tire of claim 11, wherein the cap rubber layer in the shoulder regions includes a plurality of layers stacked in the tire radial direction, and the modulus value differs between the plurality of layers.

13. The tire of claim 11, wherein in the cap rubber layer in the shoulder regions, the modulus reduces from the surface of the tread inward in the tire radial direction.

14. The tire of claim 11, wherein the cap rubber layer in the center region includes a plurality of layers stacked in the tire radial direction, and the modulus value differs between the plurality of layers.

15. The tire of claim 11, wherein in the cap rubber layer in the center region, the modulus increases from the surface of the tread inward in the tire radial direction.

* * * * *